(12) United States Patent
Chen et al.

(10) Patent No.: US 7,823,149 B2
(45) Date of Patent: Oct. 26, 2010

(54) METHOD AND SYSTEM FOR RESTORING AN OPERATING ENVIRONMENT ON A COMPUTER SYSTEM

(75) Inventors: Ernest Chen, San Jose, CA (US); Yunjian Duan, Foster City, CA (US); Yaqing Wang, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1067 days.

(21) Appl. No.: 10/142,080

(22) Filed: May 8, 2002

(65) Prior Publication Data

US 2009/0070741 A1 Mar. 12, 2009

(51) Int. Cl.
*G06F 9/445* (2006.01)
*G06F 15/173* (2006.01)

(52) U.S. Cl. .................. 717/177; 717/170; 717/172; 717/175; 717/176; 717/178; 709/239

(58) Field of Classification Search ......... 717/168–178; 714/6–10; 719/310
See application file for complete search history.

(56) References Cited

U.S. PATENT DOCUMENTS

| | | | | |
|---|---|---|---|---|
| 5,664,195 A * | 9/1997 | Chatterji | ................. | 717/178 |
| 5,828,888 A * | 10/1998 | Kozaki et al. | ................. | 717/170 |
| 5,948,101 A * | 9/1999 | David et al. | ................. | 713/2 |
| 6,094,531 A * | 7/2000 | Allison et al. | ................. | 717/176 |
| 6,163,805 A * | 12/2000 | Silva et al. | ................. | 709/227 |
| 6,167,494 A * | 12/2000 | Cheston et al. | ................. | 711/162 |
| 6,292,941 B1 * | 9/2001 | Jollands | ................. | 717/176 |
| 6,351,850 B1 * | 2/2002 | van Gilluwe et al. | ................. | 717/175 |
| 6,393,585 B1 * | 5/2002 | Houha et al. | ................. | 714/23 |
| 6,611,915 B1 * | 8/2003 | Kubik et al. | ................. | 709/211 |
| 6,802,025 B1 * | 10/2004 | Thomas et al. | ................. | 714/15 |
| 6,813,725 B1 * | 11/2004 | Hanes et al. | ................. | 714/2 |
| 6,816,964 B1 * | 11/2004 | Suzuki et al. | ................. | 713/2 |
| 7,155,713 B1 * | 12/2006 | Burkhardt et al. | ................. | 717/175 |
| 2002/0002630 A1 * | 1/2002 | Nomura et al. | ................. | 709/310 |
| 2002/0032755 A1 * | 3/2002 | Abrahams et al. | ................. | 709/219 |
| 2002/0053044 A1 * | 5/2002 | Gold et al. | ................. | 714/38 |
| 2002/0103981 A1 * | 8/2002 | Smith et al. | ................. | 711/162 |
| 2002/0178233 A1 * | 11/2002 | Mastrianni et al. | ................. | 709/217 |
| 2003/0084429 A1 * | 5/2003 | Schaefer | ................. | 717/125 |
| 2003/0131285 A1 * | 7/2003 | Beardsley et al. | ................. | 714/38 |
| 2003/0195995 A1 * | 10/2003 | Tabbara | ................. | 709/313 |
| 2004/0015957 A1 * | 1/2004 | Zara et al. | ................. | 717/174 |
| 2004/0019823 A1 * | 1/2004 | Gere | ................. | 714/13 |
| 2004/0034765 A1 * | 2/2004 | O'Connell | ................. | 713/1 |
| 2004/0153724 A1 * | 8/2004 | Nicholson et al. | ................. | 714/6 |

* cited by examiner

*Primary Examiner*—Tuan Q Dam
*Assistant Examiner*—Isaac T Tecklu
(74) *Attorney, Agent, or Firm*—Townsend and Townsend and Crew, LLP (57) ABSTRACT

A method and system for restoring an operating environment in a computer system. A request to install a target operating environment on a computer system is received at an application. The application transmits a first notification to the computer system. In response to the first notification, the computer system automatically retrieves an image, wherein the image comprises the target operating environment. The computer system automatically restores the image on the computer system such that the target operating environment is installed on the computer system. The computer system automatically transmits a second notification to the application when the image is restored. The present invention provides a method and system for automating the installation of an operating environment on a computer system.

17 Claims, 5 Drawing Sheets

METHOD AND SYSTEM FOR RESTORING AN OPERATING ENVIRONMENT ON A COMPUTER SYSTEM

FIELD OF INVENTION

Embodiments of the present invention relate to the field of computer systems. In particular, embodiments of the present invention relate to a method for restoring an operating environment on a computer system.

BACKGROUND OF THE INVENTION

Prior to the release of computer software, it is necessary to certify the software by performing a number of tests. In particular, it is necessary to test the software on each operating system for which it is intended for use. Installation testing is performed to ensure that the software can be properly installed on the desired operating system. Integration testing is performed to ensure that the software integrates properly with the components of the operating system, as well as any other applications installed on the computer system, to ensure that the software will function properly. Migration testing is performed for software upgrades to ensure that upgrade will function properly. Furthermore, depending on the nature of the software, a number of other tests may be performed, such as testing the backend database configuration and testing the operating system configuration.

Typically, because businesses and organizations may utilize different operating systems, software is released for several operating systems and computing platforms. As described above, the software needs to be tested on every operating system for which it is available, ensuring its operability to the purchaser.

Currently, software certification testing is performed manually. Typically, a software engineer searches a computer lab having computer systems with the required operating systems. Typically, the computer lab will not have the required number of computer systems that are set up in the desired testing configuration. In order to test the software in a desired configuration that is not available in the lab, the software engineer is required to manually install the desired operating system on the number of computer systems required for testing. Uninstalling and reinstalling operating systems on computer systems is time intensive, and typically requires an engineer be present throughout the entire installation process. Furthermore, since software must typically must be tested on several computer operating systems, thus requiring installation of a number of operating systems on a number of computer systems, the testing process may be very time consuming. Additionally, since the operating system installation is performed manually, current operating system installation is error prone.

SUMMARY OF THE INVENTION

Accordingly, a need exists for a method or system for restoring an operating system on a computer system that is automated and does not require manual installation of an operating system. A need also exists for a method or system that satisfies the above need, and allows for remote management of the operating system installation process.

A method and system for restoring an operating environment in a computer system is presented. In one embodiment, a request to install a target operating environment on a computer system is received at an application. In one embodiment, the target operating environment comprises an operating system. In one embodiment, the target operating environment comprises a predetermined software application. In one embodiment, the request is initiated over an application client web browser communicatively coupled to the application over a network. In the present embodiment, the application transmits a notification to the computer system.

In response to the notification, the computer system automatically retrieves an image, wherein the image comprises the target operating environment. In one embodiment, the image is retrieved from where said image resides. In one embodiment, the image resides at an image database. The computer system automatically restores the image on the computer system such that the target operating environment is installed on the computer system.

In one embodiment, the computer system automatically notifies the application when the image is restored. In one embodiment, after the image is automatically restored on the computer system, a software application is installed on the computer system. In one embodiment, the software application is then tested. In one embodiment, the results of the testing are reported to the application.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "receiving" or "retrieving" or "restoring" or "notifying" or "installing" or "testing" or "performing" or the like, may refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

A Method and System for Restoring an Operating Environment on a Computer System

Figure 1:
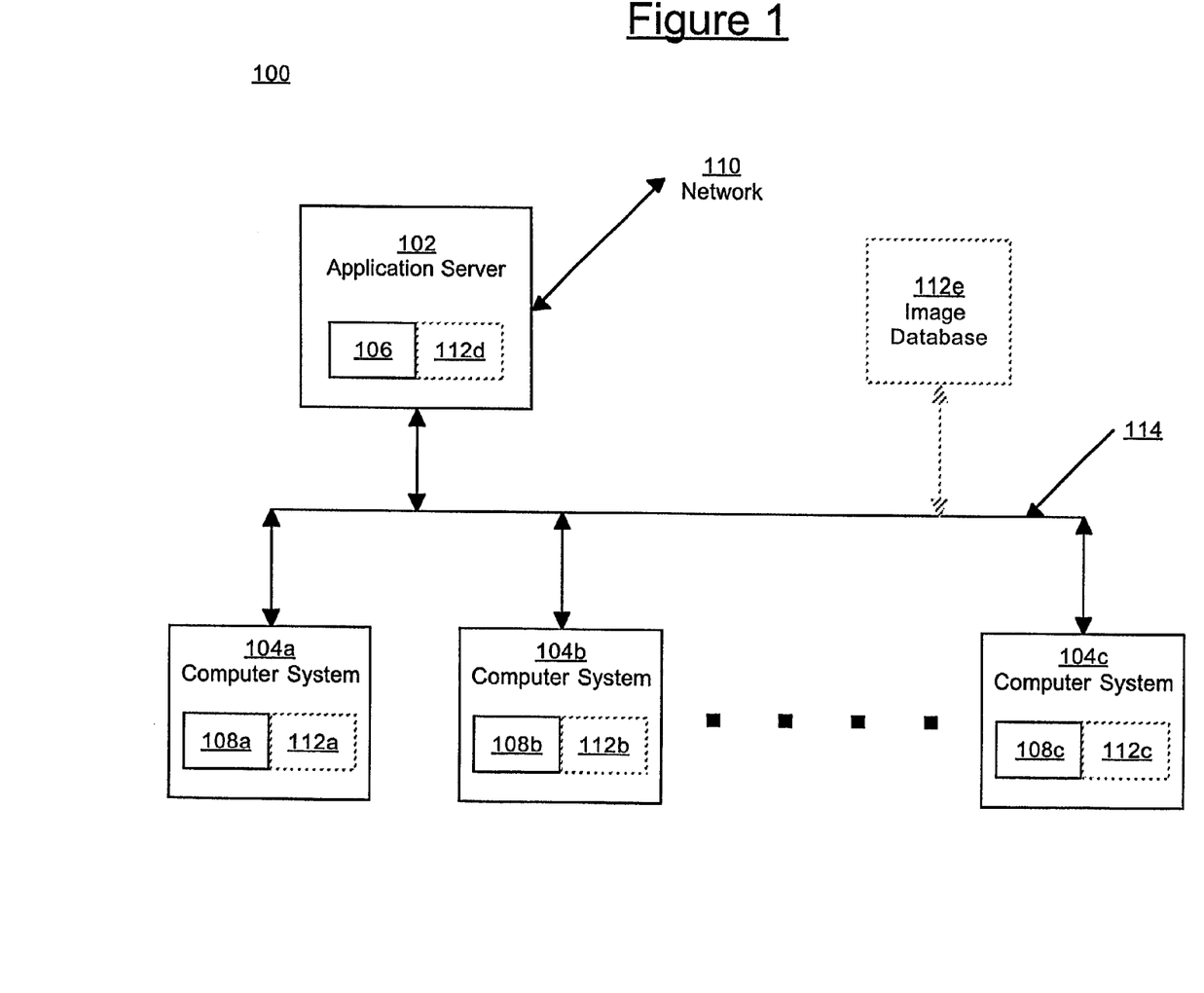
FIG. 1 is a block diagram of an exemplary computer lab topology on which embodiments of the present invention may be practiced.

FIG. 1 is a block diagram of an exemplary computer lab 100 on which embodiments of the present invention may be practiced. Computer lab 100 comprises an application server 102 and at least one computer system (e.g., computer systems 104a-c). It should be appreciated that computer lab 100 can comprise any number of application servers and computer systems, and that the topology illustrated in FIG. 1 is exemplary with respect to the number of application servers and computer systems. It should be appreciated that application server 102 and computer systems 104a-c are both computer systems (e.g., computer system 500 of FIG. 5).

Application server 102 is communicatively coupled to computer systems 104a-c over connection 114. In one embodiment, connection 114 is a wired connection. In another embodiment, connection 114 is a wireless connection. In one embodiment, application server 102 is communicatively coupled to distributed computer network 110. In one embodiment, computer network 110 is the Internet. In another embodiment, computer network 110 is an intranet. In another embodiment, computer network 110 is a local area network (LAN).

Application server 102 comprises a listener application 106. In one embodiment, listener application 106 is a software application operable to manage the installation of an operating environment on computer systems 104a-c. In one embodiment, listener application 106 performs the steps described in process 300 of FIG. 3. In one embodiment, application server 102 comprises image database 112d.

Computer system 104a comprises listener application 108a. Similarly, computer systems 104b and 104c comprise listener applications 108b and 108c, respectively. In one embodiment, listener applications 108a-c are software applications operable to restore an operating environment on computer systems 104a-c. In one embodiment, listener applications 108a-c perform the steps described in process 400 of FIG. 4. In one embodiment, computer system 104a comprises image database 112a. Similarly, in one embodiment, computer systems 104b and 104c each comprise an image database 112b and 112c, respectively.

In one embodiment, computer lab 100 also comprises an image database 112e. In one embodiment, image database 112e is located within a computer system (e.g., computer system 500 of FIG. 5). It should be appreciated that embodiments of the present invention can have any number of image databases located in one or more locations.

Figure 2:
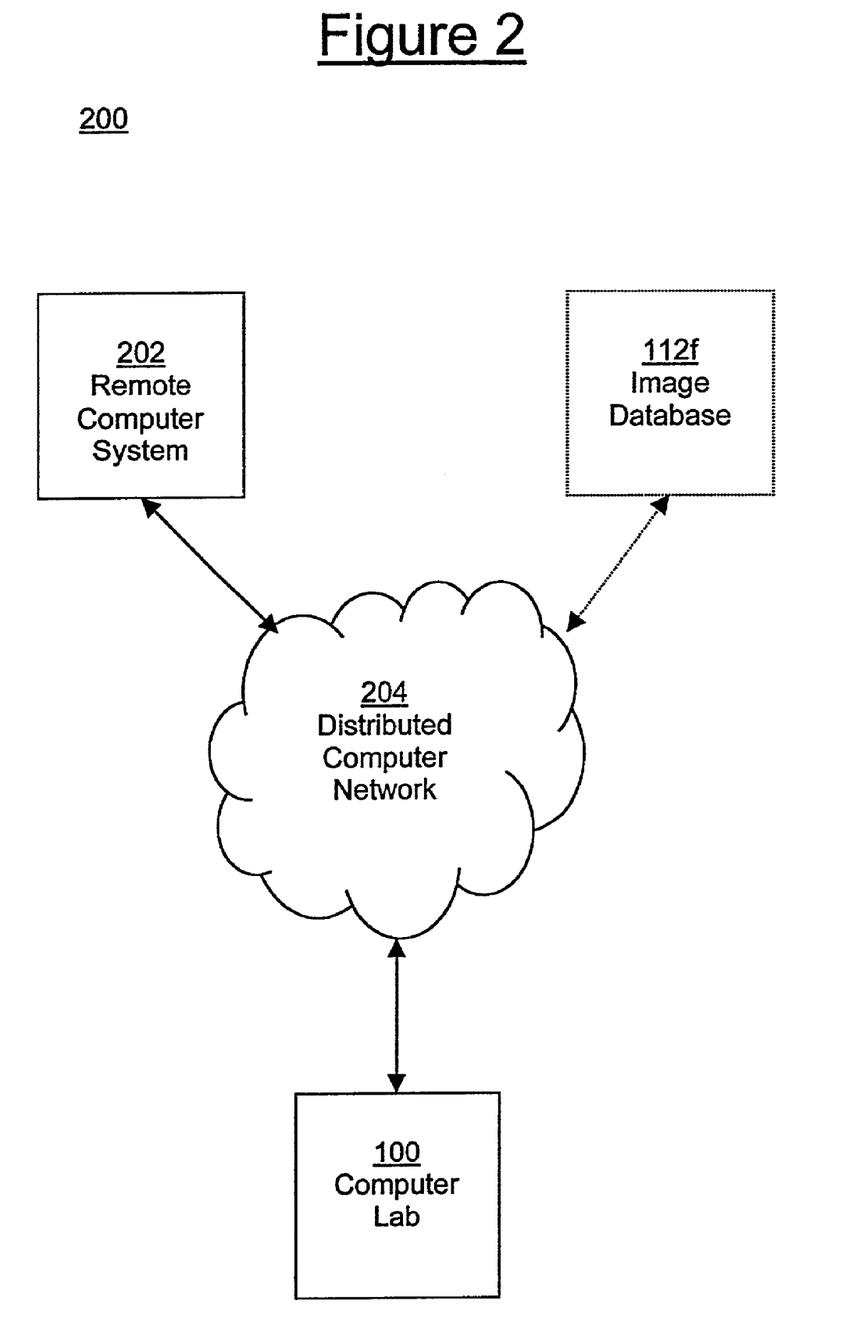
FIG. 2 is a block diagram of an exemplary computer network upon which embodiments of the present invention may be practiced.

FIG. 2 is a block diagram 200 of a distributed computer network 110 upon which embodiments of the present invention may be practiced. Distributed computer network 110 is communicatively coupled to computer lab 100 and remote computer system 202. In one embodiment, computer network 110 is the Internet. In another embodiment, computer network 110 is an intranet. In another embodiment, computer network 110 is a local area network (LAN).

Remote computer system 202 comprises an application client. In one embodiment, the application client is a web browser. In one embodiment, accessing the application client of remote computer system 202 allows a user to remotely access listener application 106 of FIG. 1. In one embodiment, computer network 110 is also communicatively coupled to image database 112f. In one embodiment, image database 112f is located within a computer system (e.g., computer system 500 of FIG. 5). As described above, it should be appreciated that embodiments of the present invention can have any number of image databases located in one or more locations.

Figure 3:
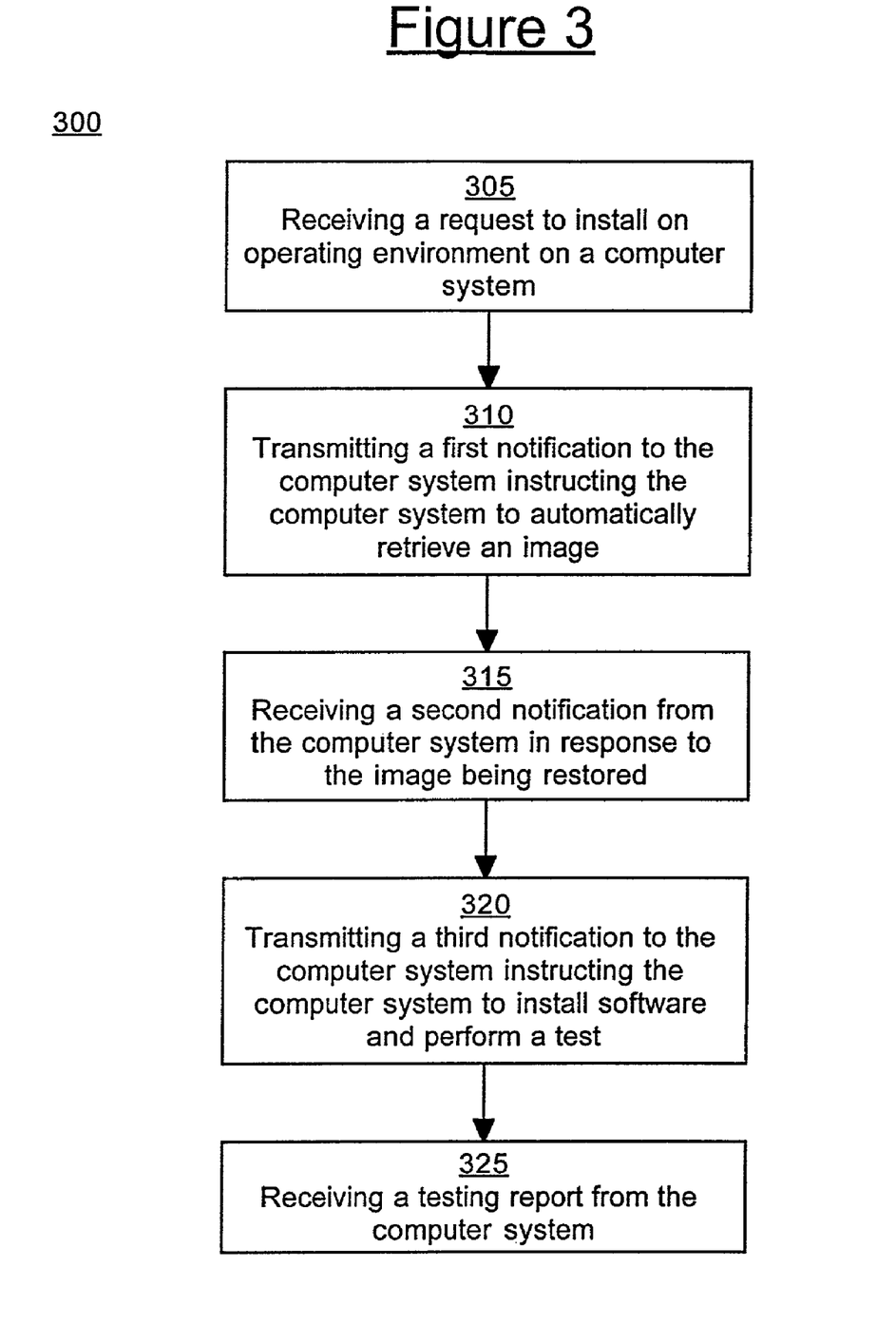
FIG. 3 is a flow chart illustrating steps in a process for managing installation of an operating environment on a computer system in accordance with one embodiment of the present invention.

FIG. 3 is a flow chart illustrating steps in a process 300 for managing installation of an operating environment on a computer system in accordance with one embodiment of the present invention. In one embodiment, process 300 is carried out by processors and electrical components under the control of computer readable and computer executable instructions. Although specific steps are disclosed in process 300, such steps are exemplary. That is, the embodiments of the present invention are well suited to performing various other steps or variations of the steps recited in FIG. 3.

At step 305 of process 300, a request to install a target operating environment on a computer system is received at an application (e.g., listener application 106 of FIG. 1). In one embodiment, the request is initiated over an application client (e.g., web browser) of a computer system communicatively coupled to the application over a distributed computer network (e.g., remote computer system 202 connected over computer network 110). In one embodiment, the request is to install a target operating environment on a plurality of computer systems communicatively coupled to the application. In one embodiment, the request is to install plurality of target operating environments onto a plurality of computer systems. It should be appreciated that embodiments of the present invention allow for one of many operating environments to be restored on a number of machines, allowing a user to configure each computer system as desired.

In one embodiment, the target operating environment comprises an operating system. In another embodiment, the target operating environment comprises a predetermined software application. In another embodiment, the target operating environment comprises a device driver. It should be appreciated that the target operating environment may be a computer operating system having any number of installed software applications and device drivers. Because the embodiments of the present invention may be used to test how a new software application performs with respect to an operating system as well as with other software applications and device drivers, the operating environment may comprise multiple software applications and device drivers.

In one embodiment, the target operating environment is stored as an image in an image database. Storing an operating environment as an image allows for easy and efficient access and restoration of a target environment. Additionally, storing an operating environment as an image allows for the storage of multiple operating environments in one image database. In one embodiment, the image database is located within the computer system (e.g., image database 112a-c of FIG. 1). In another embodiment, the image database is located within the application server (e.g., image database 112d of FIG. 1). In another embodiment, the image database is communicatively coupled to the computer system over a wired connection (e.g., image database 112e of FIG. 1). In another embodiment, the image database is communicatively coupled to the computer system over a distributed computer network (e.g., image database 112f of FIG. 2).

At step 310, a first notification is transmitted to the computer system, wherein the first notification is for instructing the computer system to automatically retrieve an image. As described above, the image comprises the target operating environment. The computer system automatically restores the image such that the target operating environment is installed on said computer system. In one embodiment, a listener application of the computer system performs a method for restoring a target operating environment as described in process 400 of FIG. 4.

At step 315, a second notification is received from the computer system, wherein the second notification is generated in response to the image being automatically restored on the computer system. In one embodiment, the second notification indicates that the image, and thus the target operating environment, has been properly restored on the computer system. In one embodiment, the application forwards the second notification to a remote computer system connected over a computer network (e.g., remote computer system 202 of FIG. 2). In another embodiment, the second notification is transmitted to an email address. In another embodiment, the second notification is transmitted to a wireless text-based pager. It should be appreciated that embodiments of the present invention forward the second notification to a user, notifying the user that the computer system has been set up as requested and is ready for further action.

At step 320, a third notification is transmitted to the computer system. In one embodiment, the third notification is for instructing the computer system to install software on the computer system and to perform at least one test. It should be appreciated that the present invention can perform any number of software test, including but not limited to: installation tests, integration tests, migration tests, back end server configuration tests, and operating system configuration tests.

At step 325, a testing report is received from the computer system, wherein the testing report is generated in response to at least one test. It should be appreciated that the contents of the testing report are dependent on the tests that are performed. In one embodiment, the testing report is then transmitted over a network (e.g., computer network 110 of FIGS. 1 and 2) to a remote computer system (e.g., remote computer system 202 of FIG. 2).

Figure 4:
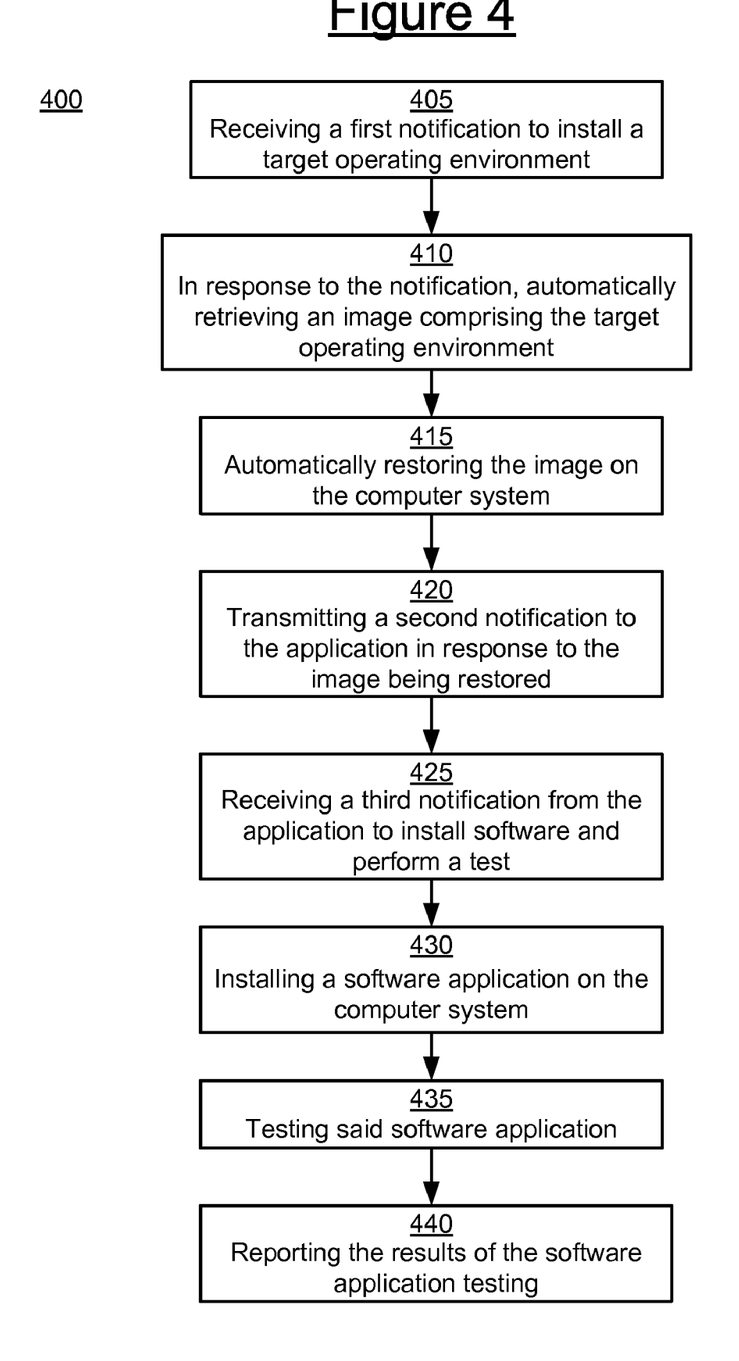
FIG. 4 is a flow chart illustrating steps in a process for restoring an operating environment in accordance with one embodiment of the present invention.

FIG. 4 is a flow chart illustrating steps in a process 400 for restoring an operating environment in accordance with one embodiment of the present invention. In one embodiment, process 400 is carried out by processors and electrical components under the control of computer readable and computer executable instructions. Although specific steps are disclosed in process 400, such steps are exemplary. That is, the embodiments of the present invention are well suited to performing various other steps or variations of the steps recited in FIG. 4.

At step 405 of process 400, a notification to install a target operating environment is received at a computer system. In one embodiment, the notification is received from an application. In another embodiment, the notification is received at the computer system over a network connection. In another embodiment, the notification is initiated over an application client of a computer system communicatively coupled to the computer system over a distributed computer.

At step 410, an image is automatically retrieved in response to the notification. In one embodiment, the image comprises the target operating environment. As described above in process 300, the image comprises the target operating environment. In one embodiment, the target operating environment is stored as an image in an image database. In one embodiment, the image database is located within the computer system (e.g., image database 112a-c of FIG. 1). In another embodiment, the image database is located within an application server (e.g., image database 112d of FIG. 1). In another embodiment, the image database is communicatively coupled to the computer system over a wired connection (e.g., image database 112e of FIG. 1). In another embodiment, the image database is communicatively coupled to the computer system over a distributed computer network (e.g., image database 112f of FIG. 2).

At step 415, the image is automatically restored on the computer system. Restoring the image operates to install the target operating environment on the computer system.

At step 420, a second notification is transmitted to the application. The second notification is generated in response to the image being automatically restored on the computer system. In one embodiment, the second notification indicates that the image, and thus the target operating environment, has been properly restored on the computer system.

At step 425, a third notification is received from the application. In one embodiment, the third notification is for instructing the computer system to install software on the computer system and to perform at least one test. It should be appreciated that steps 420 and 425 are optional. Embodiments of the present invention are directed to a method for restoring an operating environment on a computer system that does not require an application. As such, in embodiments not requiring an application, steps 420 and 425 are unnecessary.

At step 430, a software application is installed on the computer system. In one embodiment, the software application is installed in response to the third notification of step 425. In another embodiment, the software application is installed according to a user-entered response. In another embodiment, the software application is installed automatically once the image has been restored at step 415. It should be appreciated that the software application may be located on an application server, on a remote computer system communicatively coupled to the computer system over a distributed content network, or may be located on a portable storage medium (e.g., a computer disc or CD-ROM) for manual installation.

At step 435, the software application is tested. It should be appreciated that the present invention can perform any number of software test, including but not limited to: installation tests, integration tests, migration tests, back end server configuration tests, and operating system configuration tests.

At step 440, the results of the software application testing are reported. In one embodiment, the testing results are transmitted to the application. In another embodiment, the testing results are transmitted to a remote computer system communicatively coupled to the computer system over a computer network.

Exemplary Hardware in Accordance with the Present Invention

Figure 5:
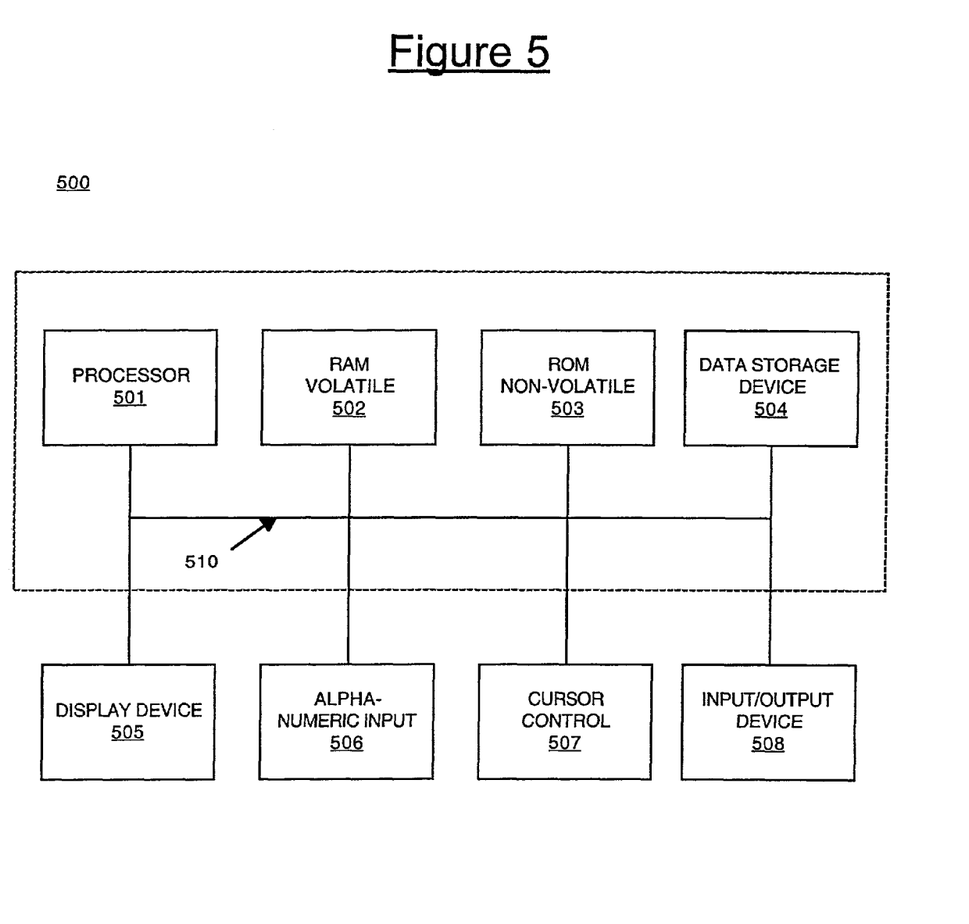
FIG. 5 is a block diagram of an exemplary computer system upon which embodiments of the present invention may be practiced.

Portions of the present invention are comprised of computer-readable and computer executable instructions which reside, for example, in computer-usable media of a computer system. FIG. 5 is a block diagram of one embodiment of an exemplary computer system 500 used in accordance with the present invention. It should be appreciated that system 500 is not strictly limited to be a computer system. As such, system 500 of the present embodiment is well suited to be any type of computing device (e.g., application server computer system, portable computing device, desktop computer, etc.). Within the following discussions of the present invention, certain processes and steps are discussed that are realized, in one embodiment, as a series of instructions (e.g., software program) that reside within computer readable memory units of computer system 500 and executed by a processor(s) of system 500. When executed, the instructions cause computer 500 to perform specific actions and exhibit specific behavior which is described in detail below.

Computer system 500 of FIG. 5 comprises an address/data bus 510 for communicating information, one or more central processors 501 coupled with bus 510 for processing information and instructions. Central processor unit(s) 501 may be a microprocessor or any other type of processor. The computer 500 also includes data storage features such as a computer usable volatile memory unit 502 (e.g., random access memory, static RAM, dynamic RAM, etc.) coupled with bus 510 for storing information and instructions for central processor(s) 501, a computer usable non-volatile memory unit 503 (e.g., read only memory, programmable ROM, flash memory, EPROM, EEPROM, etc.) coupled with bus 510 for storing static information and instructions for processor(s) 501. Computer system 500 also includes a computer usable mass data storage device 504 such as a magnetic or optical disk and disk drive (e.g., hard drive or floppy diskette) coupled with bus 510 for storing information and instructions.

System 500 also includes one or more input/output devices 508 (e.g., signal generating and receiving devices) coupled with bus 510 for enabling system 500 to interface with other electronic devices and computer systems. The communication interface(s) 508 of the present embodiment may include wired and/or wireless communication technology. For example, within the present embodiment, the communication interface 108 is a wireless communication port, but could also alternatively be any of a number of well known communication standards and protocols, e.g., serial communication port, Universal Serial Bus (USB), Ethernet, FireWire (IEEE 1394), parallel, small computer system interface (SCSI), infrared (IR) communication, Bluetooth wireless communication, broadband, and the like.

Optionally, computer system 500 may include an alphanumeric input device 506 including alphanumeric and function keys coupled to the bus 510 for communicating information and command selections to the central processor(s) 501. The computer 500 can include an optional cursor control or cursor directing device 507 coupled to the bus 510 for communicating user input information and command selections to the central processor(s) 501. The cursor directing device 507 can be implemented using a number of well known devices such as a mouse, a track-ball, a track-pad, an optical tracking device, a touch screen, etc. Alternatively, it is appreciated that a cursor can be directed and/or activated via input from the alphanumeric input device 506 using special keys and key sequence commands. The present embodiment is also well suited to directing a cursor by other means such as, for example, voice commands. An optional display device 505 is coupled to bus 510 of system 500 for displaying video and/or graphics. It should be appreciated that optional display device 505 may be a cathode ray tube (CRT), flat panel liquid crystal display (LCD), field emission display (FED), plasma display or any other display device suitable for displaying video and/or graphic images and alphanumeric characters recognizable to a user.

The present invention provides a method and system for automating the installation of an operating environment on at least one computer system. In particular, the present invention provides a method and system for restoring an operating environment on a computer system that is automated and does not require manual installation of an operating system. Furthermore, the present invention also provides a method or system that provides for remote management of the operating system installation process.

The preferred embodiment of the present invention, a method and system for restoring an operating environment, is thus described. While the present invention has been described in particular embodiments, it should be appreciated that the present invention should not be construed as limited by such embodiments, but rather construed according to the below claims.

What is claimed is:

1. In a computer system, a method for restoring an operating environment, said method comprising:

receiving a notification to install a first target operating environment of a plurality of operating environments, wherein each of the plurality of operating environments comprises a different operating system and a software application under test with respect to each operating system, wherein said notification is received at a first computer system from an application server in response to a request to install said first target operating environment initiated at a remote computer system and received at said application server, and wherein said remote computer system is disposed remotely from said first computer system and said application server;

in response to said notification, automatically retrieving, by said first computer system, a first image of a plurality of images, wherein each of said plurality of images stores one of the plurality of operating environments and wherein the retrieved first image stores said first target operating environment;

automatically restoring said first image on said first computer system such that said first target operating environment is installed on said first computer system, wherein automatically restoring said first image on said first computer system further comprises installing the operating system and the software application of the first target operating environment on said first computer system;

automatically notifying said remote computer system when said first image is restored on said first computer system;

testing said software application with respect to the operating system of the first target environment on the first computer system; and reporting results of said testing of the software application from the first computer system to the remote computer system.

2. A method as recited in claim 1 wherein said request is received at an application.

3. A method as recited in claim 2 further comprising automatically notifying said application when said first image is restored on said first computer system.

4. A method as recited in claim 2 wherein said request is initiated over an application client communicatively coupled to said application over a network.

5. A method as recited in claim 1, wherein said automatically retrieving said first image further comprises automatically retrieving said first image from an image database.

6. The method of claim 1, further comprising:

receiving a notification to install a second target operating environment of the plurality of operating environments, wherein said notification is received at a second computer system from the application server in response to a request to install said second target operating environment initiated at the remote computer system and received at said application server, and wherein said remote computer system is disposed remotely from said second computer system;

in response to said notification, automatically retrieving, by said second computer system, a second image of the plurality of images, wherein the retrieved second image stores said second target operating environment;

automatically restoring said second image on said second computer system such that said second target operating environment is installed on said second computer system, wherein automatically restoring said second image on said second computer system further comprises installing the operating system and the software application of the second target operating environment on said second computer system;

automatically notifying said remote computer system when said second image is restored on said second computer system;

testing said software application with respect to the operating system of the second target environment on the second computer system; and reporting results of said testing of the software application from the second computer system to the remote computer system.

7. In an application, a method for managing installation of an operating environment on a computer system, said method comprising:

receiving a request from a remote computer system to install a target operating environment on a computer system, wherein the target operating environment comprises one of a plurality of operating environments, wherein each of the plurality of operating environments comprises a different operating system and a software application under test with respect to each operating system, wherein said request is received from an application client, and wherein said remote computer system is disposed remotely from said computer system and said application client;

transmitting a first notification to said computer system, said first notification for instructing said computer system to automatically retrieve an image of a plurality of images, wherein each of said plurality of images stores one of the plurality of operating environments and wherein the image stores said target operating environment and said image being automatically restored on said computer system such that said target operating environment is installed on said computer system;

receiving a second notification from said computer system that said image has been automatically restored in said computer system; and forwarding said second notification to said application client;

transmitting a third notification to said computer system, said third notification instructing said computer system to install software on said computer system including the operating system and software application of the target operating environment and to perform at least one test of the software application with respect to the operating system of the target operating environment; and receiving a testing report from said computer system, said testing report generated in response said test.

8. A method as recited in claim 7 wherein said application client is communicatively coupled to said application over a network.

9. A method as recited in claim 7, wherein said automatically retrieving said image further comprises automatically retrieving said image from an image database.

10. A computer-readable memory having computer-readable program code embodied therein for causing a computer system to perform a method for restoring an operating environment, said method comprising:

receiving a notification to install a target operating environment of a plurality of operating environments, wherein each of the plurality of operating environments comprises a different operating system and a software application under test with respect to each operating system, wherein said notification is received from an application server in response to a request initiated at a remote computer system and received at said application server, and wherein said remote computer system is disposed remotely from said computer system and said application server;

in response to said notification, automatically retrieving, by said computer system, an image of a plurality of images, wherein each of said plurality of images stores one of the plurality of operating environments and wherein the retrieved image stores said target operating environment;

automatically restoring said image on said computer system such that said target operating environment is installed on said computer system, wherein automatically restoring said image on said computer system further comprises installing the operating system and the software application of the target operating environment on said computer system; and automatically notifying said remote computer system when said image is restored on said computer system;

testing said software application with respect to the operating system of the target environment; and reporting results of said testing.

11. A computer-readable memory as recited in claim 10 wherein said request is received at an application.

12. A computer-readable memory as recited in claim 11 further comprising automatically notifying said application when said image is restored on said computer system.

13. A computer-readable memory as recited in claim 11 wherein said request is initiated over an application client communicatively coupled to said application over a network.

14. A computer-readable memory as recited in claim 10, wherein said automatically retrieving said image further comprises automatically retrieving said image from an image database.

15. A computer-readable memory having computer readable program code embodied therein for causing a computer system to perform a method for managing installation of an operating environment on a computer system, said method comprising:

receiving a request from a remote computer system to install a target operating environment on a computer system, wherein the target operating environment comprises one of a plurality of operating environments, wherein each of the plurality of operating environments comprises a different operating system and a software application under test with respect to each operating system, wherein said request is received from an application client, and wherein said remote computer system is disposed remotely from said computer system and said application client;

transmitting a first notification to said computer system, said first notification for instructing said computer system to automatically retrieve an image of a plurality of images, wherein each of said plurality of images stores one of the plurality of operating environments and wherein the image stores said target operating environment and said image being automatically restored on said computer system such that said target operating environment is installed on said computer system;

receiving a second notification from said computer system that said image has been automatically restored in said computer system; and     forwarding said second notification to said application client;

transmitting a third notification to said computer system, said third notification instructing said computer system to install software on said computer system including the operating system and software application of the target operating environment and to perform at least one test of the software application with respect to the operating system of the target operating environment; and     receiving a testing report from said computer system, said testing report generated in response said test.

16. A computer-readable memory as recited in claim 15 wherein said application client is communicatively coupled to said application over a network.

17. A computer-readable memory as recited in claim 15, wherein said automatically retrieving said image further comprises automatically retrieving said image from an image database.

\* \* \* \* \*